Sept. 19, 1961 G. T. RANDOL 3,000,457
PNEUMATICALLY-ACTUATED ASSISTOR FOR VEHICULAR STEERING SYSTEMS
Filed Jan. 3, 1957 4 Sheets-Sheet 1

Inventor

Sept. 19, 1961  G. T. RANDOL  3,000,457
PNEUMATICALLY-ACTUATED ASSISTOR FOR VEHICULAR STEERING SYSTEMS
Filed Jan. 3, 1957  4 Sheets-Sheet 2

Inventor

Sept. 19, 1961 G. T. RANDOL 3,000,457
PNEUMATICALLY-ACTUATED ASSISTOR FOR VEHICULAR STEERING SYSTEMS
Filed Jan. 3, 1957 4 Sheets-Sheet 3

United States Patent Office 3,000,457
Patented Sept. 19, 1961

3,000,457
PNEUMATICALLY-ACTUATED ASSISTOR FOR VEHICULAR STEERING SYSTEMS
Glenn T. Randol, Mountain Lake Park, Md., assignor of fifty percent to Hamill-Markus Industries, Inc., Warren, Mich.
Filed Jan. 3, 1957, Ser. No. 632,365
6 Claims. (Cl. 180—79.2)

The present invention relates to power-assisted steering systems and mechanism for automotive vehicles and the like in which manual operating force is supplemented by power assistance, said mechanism including a pressure-differential actuated assistor for reducing the manual steering effort normally required during low vehicular speed operations and while parking the vehicle.

Broadly, the present invention seeks to provide novel power-assisted steering in which engine-torque is not necessarily a function of its operation, which is effective only during low vehicular speeds or when parking, and which reverts automatically to full manual control upon increase in vehicular speed to or above a predetermined factor.

It is, therefore, a primary object of my invention to produce a simplified steering mechanism including a novel follow-up control valve responsive to incremental movements of the steering wheel for energizing a servomotor operatively connected to the steering linkage in such manner that a right turn produces a corresponding movement of the servo-power element to assist in the turning of the vehicle wheels in that direction, while a leftward rotation of the steering wheel produces a corresponding operation of the servomotor to assist in turning the wheel in the latter direction. Upon halting rotation of the steering wheel, the control valve moves correspondingly to place the power element of the servomotor in a corresponding neutral position whereby in the absence of road wheel deflections, the vehicle is caused to maintain the selected course without power-assist. However, in the event that the front wheels of the vehicle are deflected from such course with the steering wheel so held, the control valve would open to energize the servomotor tending to place the vehicle back on its said course of driving. Thus, the vehicle is stabilized while driving the selected course by the servomotor without the necessity of constantly urging the steering wheel slightly to maintain such course.

More specifically, the present invention seeks to utilize a vacuum booster system to furnish additional power to assist manual operation, and therefore, reduce the amount of manual turning effort required at the steering wheel with the further advantages of reducing road shock or "kickback" which might cause the driver to lose control of the car.

An object related to the foregoing object next above, is to use the vacuum produced within the intake manifold of the vehicle engine for operating the vacuum booster or servomotor, and to associate therewith in a novel manner, a vacuum storage tank to provide a reserve supply of vacuum for limited operation of the vacuum booster during those times when the engine is not running or when the accelerator is depressed to accelerate the engine with consequent reduction of vacuum production. A further advantage in the use of a storage tank resides in the provision of uniform vacuum conditions for operating the booster servomotor.

A further important object of the present invention is to provide novel control means for said vacuum booster unit whereby the effectiveness of the booster unit is limited to low vehicular speeds responsive to either a governor device operated proportionally to vehicular speed or to a fluid-pressure operated device responsive to a predetermined engine speed as defined by the lubricating oil in the pressure line of the pressure lubricating system of the engine or the rear pump of a vehicle equipped with an automatic hydraulic transmission, or if desired, the effectiveness of the booster unit to assist in the manual steering operation may be controlled by a control device operated at will by the driver.

An object more specifically related to the object next above, is the provision of a governor switch in which the contacts are closed to energize the electrical system comprising a solenoid-operated shut-off valve disposed between the aforesaid vacuum tank and the main control valve aforesaid with the steering linkage mechanism, the latter valve being responsive to approximately one-third of the normal manual turning effort at the steering wheel rim, to cause power-assistance to be effective.

A further object related to the two objects immediately preceding, is the provision of a fluid-pressure operated switch mechanism responsive to a predetermined pressure condition within the engine lubricating system, or the fluid pressure delivered by the rear hydraulic pump of an automatic transmission, to close the contacts to cause energization of the electrical system aforesaid, or a manual switch may be provided in the electrical circuit for controlling the condition of the circuit at will.

The aforesaid main control valve is of novel construction to provide sensitive response to movements of the steering wheel in effecting either a right or left turn and to stabilize straight ahead driving or halted condition of the steering wheel while executing a turn, up to a predetermined vehicular speed to prevent "wandering," and wherein the pair of principal movable elements of said valve are telescopically-related and comprise an outer housing element and an inner sliding "spool-type" element biased to a central closed position with respect to each other by a normally preloaded centering helical compression spring, and operable selectively to two open positions to energize the vacuum booster unit according to the turning movement of the steering wheel (right or left) and at full open position said elements cooperate to limit the extent of such open position whereby said elements are firmly pressed in contact with a portion of the valve housing to enable direct manual operation of the steering mechanism with or without power assistance.

An object related to the object next above is to provide a modified novel main control valve structure utilizing a pair of poppet-type elements and an actuator member therefor responsive to the turning movement of the steering wheel to control operation of the vacuum booster unit as aforesaid.

A further important object of the invention is related to the novel use of vacuum-power which simplifies the mechanism required for power assist, and, therefore materially reduces the cost of such equipment. Further, installation is greatly simplified over existing production power steering devices utilizing hydraulic power for their operation with consequent need for a pump in constant operation, and requiring costly design and manufacturing steps.

Another object related to the object immediately above is the additional feature with respect to use of vacuum-power which is available without sacrificing engine power required for driving pumps, etc., in the hydraulic or compressed air types of power steering.

The present invention utilizing vacuum-power for its operation, is based on the principle that while the vehicle is operating at whatever cruising speed desired there is no need for power-assist since steering effort is materially reduced under such driving conditions, but during parking and low speed driving of the vehicle, power-assist is considered an advantage since manual steering effort is reduced thereby. Vacuum-power in such instances, has a practical and economical application in that during low speed and parking vehicle operations, high vacuum is produced to thus assist in such vehicular control, while with the vehicle operating on the open road at higher speeds, the vacuum produced under such conditions is relatively low, and thus incapable of producing an appreciable assist in the steering operations since at such speeds steering effort is materially reduced automatically and thus power-assist is not required, and too, release of the accelerator at such higher car speeds induces high vacuum conditions within the engine intake-manifold which makes power assist unpredictable with consequent erratic steering and loss of car control. Use of novel shut-off valve means herein disclosed in the vacuum line between the intake-manifold and main control valve mechanism renders this direct vacuum connection from the engine practical since at higher car speeds should the driver turn the steering wheel with the accelerator released, the effort required is normal to usual manual operation.

A further more specific object of the invention is the incorporation of novel combined control valve and centering means whereby the pair of valve elements are controlled by connection with the steering pitman arm and steering linkage in such manner that the valve elements and associated linkage always assume a neutral position with respect to the pitman arm when the latter is stopped irrespective of the turned position of the steering wheel so that over-steering is avoided.

The present system further simplifies the external hose connections by reducing the number to three, one of such connections being between the engine intake-manifold and the control valve and two additional connecting lines between the control valve and the servomotor, and further, its application to any vehicle does not require any altering of the existing steering linkage or steering gear proper.

Another important object of the present invention is to provide novel control means whereby the vacuum-power assist is rendered inoperative to assist or interfere in any manner with normal manual steering of the associated vehicle at or above vehicular speeds of 15 to 20 m.p.h. or at or above a predetermined engine speed, the present invention having as one of its salient features the restoration of normal manual effort in steering above a predetermined vehicular operating speed.

The proposed novel vacuum-assist steering system is preferably of the linkage type, wherein the vacuum servomotor is anchored to the vehicle frame and the movable power element thereof is connected to the center link. The opposite end of the link is attached to the main control valve which receives the pitman arm for actuation thereby. It is therefore, a principal aim of the present invention to produce a low-cost simple, power steering mechanism for installation in automobiles at the factory or as an accessory on after-market cars by the retail dealer and wherein maintenance is negligible.

A further object of the present invention is the elimination of engine power sacrificed to drive the pump for producing hydraulic or air pressure to operate hydraulic and compressed air power steering systems presently offered on the market, by using the vacuum inherently produced by the engine.

Another arrangement of the present vacuum-assisted steering system utilizes the variations in the gaseous pressure within the engine intake-manifold trapped ahead of a one-way check-valve in a storage tank, for limited vacuum-power assistance, and thereafter, automatically reverting the steering control to full manual operation, the degree of pressure within the manifold being regulated by the extent of opening of the carburetor throttle plate in an engine accelerating direction from engine idling position thereof, whereby maximum reduced pressure exists (maximum vacuum) when the throttle plate is in idling position with the pressure increasing to lower vacuum efficiency as the throttle plate is opened. Accordingly, vacuum-power assistance is provided for limited effectiveness to assist in steering the vehicle wheels at low speeds as when parking or turning with each full release of the throttle plate to idling position restoring the maximum vacuum condition within the tank for another limited cycle of steering assistance as aforesaid with the throttle advanced in an engine accelerating direction which if maintained, exhausts the vacuum from the tank causing the steering control to revert automatically to full manual effort as when cruising on highways.

Other and further features and objects of the present invention will become apparent to those skilled in the art upon a consideration of the accompanying drawings and following description wherein are disclosed different embodiments of the invention with the understanding that such changes may be made therein as fall within the scope of the appended claims without departing from the spirit of the invention.

This invention has a particular use and value in connection with motor vehicles or the like having the known forms of manual steering gears. It has particular adaptation to such vehicles for incorporation in the linkage system between the steering gear proper and vehicle wheels, and therefore, readily installed in after-market vehicles.

It will be understood from the description to follow that the cycle of operation and various features of the mechanism are clearly adaptable to other assemblies than the foregoing. This cycle relates to the two-way energization of the power-mechanism in response to corresponding movements of a personally-operated member, such as, in the present instance, the steering wheel.

Figures 1, 6:
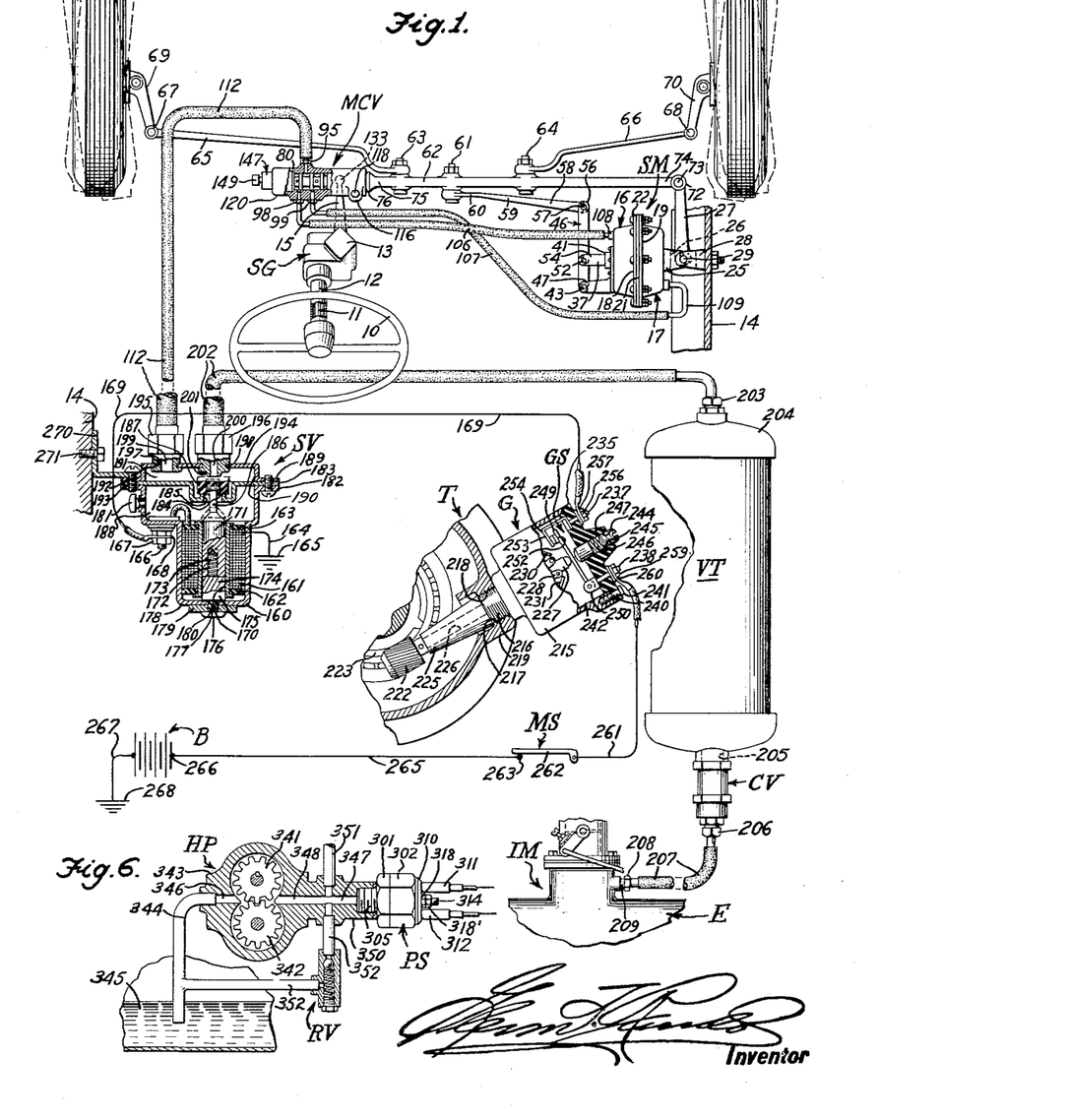
FIGURE 1 is a schematic view of the steering gear mechanism of an automotive vehicle showing associated therewith the different components constructed and interrelated in accordance with the present invention, the steering wheel being positioned for straight ahead driving of the vehicle at speeds between zero and 15–20 m.p.h. with the parts of the different components correspondingly positioned.
FIGURE 6 is a vertical sectional view of a modification showing a conventional engine-driven lubricating pump and oil circuits therefor associated with a fluid-pressure actuated switch.

In FIGURE 1, wherein the invention is applied to a conventional manually-operated steering gear mechanism generally designated SG, there are fragmentary portions of an internal-combustion engine E and associated inlet-manifold IM, a vacuum-servomotor SM, a master control valve MCV, a governor G, a governor actuated switch GS, a shut-off valve SV, a vacuum storage tank VT, a check-valve CV, a master manual switch MS, and a storage battery B.

Referring now in detail to the drawings, there is illustrated in FIGURE 1 a steering wheel 10 secured to a steering shaft 11 which extends at an angle upwardly through a hollow steering column 12 into the driver's compartment of the vehicle, and the lower end of said shaft is connected to a steering gear 13, rigidly anchored to the vehicle frame 14, having a pitman or steering arm 15.

Figures 4, 5:
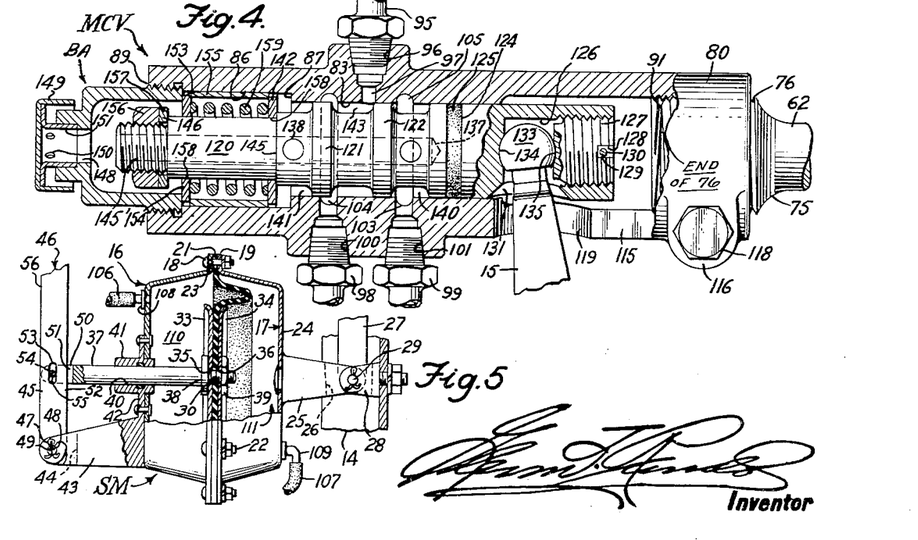
FIGURE 4 is another operated view similar to FIGURE 3 but showing the movable valve elements in the position corresponding to vacuum assistance in making a right turn of the vehicle.
FIGURE 5 is a longitudinal sectional view of the vacuum servo-booster of FIGURE 1 on an enlarged scale, showing details of its construction.

The vacuum-actuated servomotor SM is the double-acting type and comprises: two cup-shaped casings 16, 17 having their open ends formed with annular outturned flanges 18, 19 between which the peripheral marginal portion of a flexible power diaphragm 21 is secured in air-tight sealed relation by means of a plurality of bolts 22 projecting through registering holes 23 in the flanges and diaphragm portion, to form a unitary assembly best demonstrated in FIGURE 5. End wall 24 of casing 17 is rigid with a clevis 25 coaxially disposed with respect thereto, and an open end 26 of the clevis is adapted to receive one end of an arm 27. A U-shaped bracket 28 is fixed to the frame 14 and aligned holes are provided through the legs of the bracket, end of arm 27, and clevis 25 for reception of a pivot pin 29 therethrough whereby the servomotor SM and arm 27 are independently anchored to the frame for relative pivotal movement with respect to the frame and each other. The diaphragm 21 has a central opening at 30 and clamping plates 33, 34 are provided on opposite sides of the diaphragm with corresponding registering central holes 35, 36 respectively through which the threaded end of a piston rod 37 projects to bring an annular flange 38 integral with the rod in contact with plate 33 whereby an impinging effect is exerted on the plates and diaphragm when nut 39 is drawn tight on the threaded end, the other end of the piston rod projects through an opening 40 in a bushing 41 rigidly attached to the outer face of casing 16 end wall 42 in central disposition with respect thereto whereby reciprocating movement of the diaphragm is correspondingly imparted to the piston rod. The outer face of the end wall 42 is also equipped with a forwardly extending bracket 43 to one side of the bushing 41 with which it may be integral as illustrated or directly attached independently to the casing wall. The free end of this bracket is slotted at 44 into which one end 45 of a power arm 46 is fitted and a pivot pin 47 projects through holes 48 and 49 in the bracket and power arm end to pivotally support the latter for oscillatory movement with respect to the servomotor SM. The free end 50 of the piston rod has a cross slot 51 therethrough for reception of the medial portion 52 of the power arm, the latter having a longitudinal slot 53 through which a pivot pin 54 projects from registering holes 55 through the piston rod on opposite side of the cross slot. This latter connection enables reciprocable movement of the piston rod to impart an oscillating movement to the power arm. The other end 56 of the power arm is suitably connected as by a pin 57 to one end 58 of a link 59 with the other end 60 of the link pivotally connected by a pivot bolt 61 to a center link 62. On opposite sides of the pivot 61 are spaced pivot bolts 63, 64 to which are pivotally connected tie rods 65, 66, respectively, which in turn are pivotally connected at 67, 68 to steering knuckle arms 69, 70 on which the vehicle wheels 71 are mounted. However, it must be appreciated that the actual ground engaging means or steered members may be any of the well-known types depending upon the application, and that it is not intended to limit the use of the present system to that of steered members illustrated. The free end 72 of arm 27 is pivotally connected as by a bolt 73 to one end 74 of the center link 62 and the opposite end 75 thereof is formed with an enlarged threaded section 76.

Figure 2:
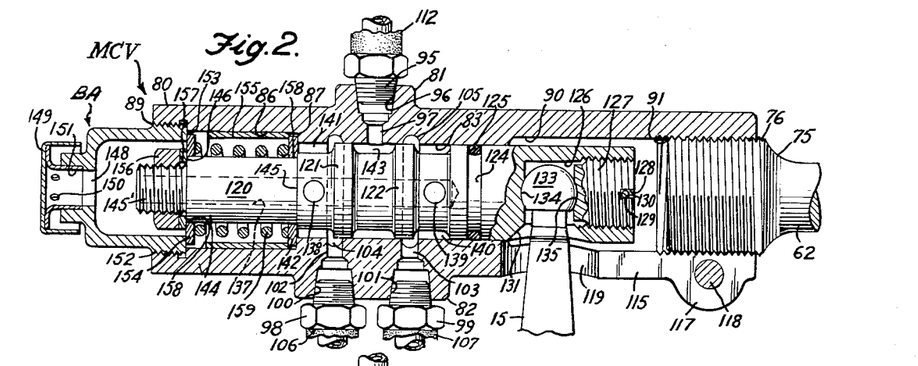
FIGURE 2 is a longitudinal horizontal section of the main control valve with the movable elements thereof positioned according to the showing in FIGURE 1.

The master control valve means MCV is disposed in axial alignment with the threaded end of the center link 62, and comprises a cylindrical housing 80 having diametrically opposed lateral embossments 81, 82 on its exterior, a medially disposed longitudinal bore 83 merges with a counterbore 86 to form an annular internal shoulder at 87 and the outer end of the counterbore terminates into an internally threaded section at 89, the opposite end of the longitudinal bore terminates into a counterbore 90 which is internally threaded at 91 to form the outer terminus thereof. The enlarged threaded end 76 of the center link 62 engages the internal threads 91 to rigidly attach the valve housing 80 thereto in coaxial disposition. The housing embossment 81 is equipped with a conduit fitting 95 threaded into a bore 96 which communicates with a port 97 through the housing wall, and the embossment 82 is equipped with a pair of longitudinally spaced conduit fittings 98 and 99 threaded into bores 100 and 101, respectively, which in turn communicate with ports 102 and 103 connected to annular channels 104, 105 respectively in the surface of the bore 83. Flexible conduits 106 and 107 connect the fittings 98 and 99 respectively to fittings 108 and 109 on the servomotor casings 16, 17 said latter tubular fittings communicating with power chambers 110, 111 formed within the servomotor SM between the diaphragm 21 and casing members aforesaid. One end of a flexible conduit 112 is connected to the tubular fitting 95. An open end longitudinal slot 115 is provided through the wall of the counterbore 90, lateral bosses 116, 117 project outwardly from the end of the slot in circular alignment with the threaded portion 91, on opposite sides flush with the slot walls. Registering holes are provided through said bosses through which a clamping bolt 118 projects to lock the threaded end of the center link 62 securely in threaded connection as depicted in FIGURE 2 to the control valve housing 80. The inner end of the slot 115 is formed with arcuate openings at 119.

A spool-type valve element 120 slidably fits into the longitudinal bore 83 and comprises a pair of centrally disposed spaced annular lands 121, 122, for controlling the annular channels 104 and 105, an end land 123, an exterior groove 124 fitted with an annular sealing element 125 spaced from the end land, an end bore 126 threaded at its outer end for reception of a threaded plug 127 having a cross end slot 128 for a pin 129 which projects through registering holes 130 through the wall of the bore 126. A conical hole 131 is made through the wall of the bore 126 adjacent the end thereof for establishing communication between the bore 126 and exterior of the slide valve, said hole 131 normally registering with the arcuate portions 119 and slot 115. Projecting through the aforesaid holes 119 and 131 is a ball end 133 of the pitman arm 15, said ball end being received between opposed concavities 134, and 135 formed in the end wall of the bore 126 and plug 127 whereby a universal connection is provided therebetween enabling relative movement of the slide valve element 120 with respect to the valve housing 80 or in unison therewith at the end of the slide valve movement in either direction as will appear. At the end opposite to the pitman arm connection, the slide valve 120 is also provided with an axial passageway 137 which is intersected by cross passageways 138 and 139 to place annular chamber 140 formed between land 122 and 123 in communication with the atmosphere, and another annular chamber 141 formed between the land 121 and an abutment ring 142 normally engaging the shoulder 87. A central annular chamber 143 is provided between lands 121, 122 in constant communication with port 97. A reduced extension 144 projects leftward as viewed in FIGURE 2 to form an external annular shoulder 145 with the normal diameter of the valve element 120 projecting leftward from land 121 (see FIGURE 2) aforesaid. This latter shoulder is adapted to normally engage the abutment ring 142 when the slide valve is in "neutral" position or one of its operative positions causing power assistance. The extension 144 terminates into a reduced threaded portion 145' to form another annular shoulder 146 on the slide valve. A breather assembly generally designated BA of cup-shaped formation is fitted at its outer end with passage 148 which in turn is equipped with a breather cap 149 having radial holes 150 in the tubular portion 151 which is secured in the passage 148. This breather assembly BA is threaded at 152 on the exterior of its open end which threads engage the valve housing threads 89 to close the open end of the counterbore 86 with the inner end of the threaded portion 152 forming an annular shoulder 153 in confronting relation to the housing shoulder 87. An abutment washer 154 is provided for engaging the shoulder 153 and disposed between the washer 154 and ring 142 is a relatively slidable stop sleeve 155 for limiting the sliding movement of the washer and ring, and therefore, the sliding movement of the slidable valve to its two open positions. A nut 156 and lock washer 157 are received by the threads 145', the washer and ring aforesaid are each formed with a central opening 158 in coaxial disposition through which the reduced extension 144 projects with the washer 157 acting as an annular shoulder for the marginal face of the opening through the washer 154 to engage in circular alignment with the shoulder 153, and a normally preloaded helically formed centering spring 159 encircles the reduced extension 144 within the top sleeve 155 with its ends bearing against the confronting faces of the washer 154 and ring 142 to establish the latter in engagement with their respective shoulders aforesaid on the housing and slide valve whereby "neutral" condition of the slide valve 120 is established with respect to its housing 80 and connected steering linkage for straight ahead driving, all as portrayed in FIGURES 1 and 2.

The solenoid-controlled shut-off valve SV comprises: a substantially cup-shaped casting 160 fitted with a tubular coil 161 between circular end washers 162, 163 made of insulative material with one end of the coil winding grounded by a conductor 164 at 165 to the vehicle chassis, and the other end connected to a terminal 166 properly insulated from the metallic casing aforesaid, said terminal having an exterior double-nut connection 167 between which terminal 168 of a conductor 169 is attached. The tubular winding 161 is provided with a central longitudinal opening 170 therethrough for accommodation of a movable armature 171 energizable by the coil. This aramature has a bore 172 of predetermined depth from its lower end as portrayed in FIGURE 1, for reception of a normally preloaded coil spring 173 adapted to act on the armature and the confronting end 174 of a stop element 175 rigidly secured as by reduced extension 176 projecting through a central hole 177 in the end wall 178 of the casing 160 in coaxial disposition with respect to the armature. An exterior end plate 179 is adapted to reinforce the end wall 178 and is provided with a registering hole 180 through which the outer end of the extension 176 projects peened over to secure the plate 179, casing 160 and stop element 175 rigidly together. The lower end of the spring 173 acts against the stop to thus bias the armature upwardly. The upper open end of the casing 160 is formed into a substantially rectangular opening having an air vent 181. The upper marginal portion of the rectangular opening is formed with an outturned flange 182 and overlying this flange is a valve plate 183 provided with a circular valve seat 184 having a central opening 185 coaxially disposed with respect to the armature. The upper end of the armature has a reduced stem 186 which projects through the opening 185 with a valve disc 187, preferably of plastic or rubber, attached to the upper end of said stem and operable to close the opening 185 when engaging the seat 184 to thus isolate a lower atmospheric chamber 188 formed below the valve plate by the rectangular opening. This disposition of the parts corresponds to open condition of the valve disc. The upper side of the valve plate is engaged by a corresponding marginal outturned flange 189 forming the marginal portion of an inverted cup-shaped cover member 190 to provide between the valve plate and interior of the member, a vacuum-air chamber 191. A plurality of bolts 192 projecting through registering holes 193 in the flanges and marginal portion of the plate aforesaid secure them rigidly together in air-tight sealed relationship to the casing 160, and the upper end wall 194 of the cover 190 is fitted as by swaging with a pair of spaced rigid tubular fittings 195, 196 having shoulders 197, 198 and passageways 199, 200, respectively, therethrough communicating with the air-vacuum chamber 191 and to the exterior thereof, the inner end of fitting 196 serving as a valve seat 201 encircling the passageway 200, said seat being engageable by the upper face of the valve disc (dashed line position), wherein de-energization of the coil 161 releases the armature for upward movement by spring 173 to thus open both chambers 188, 191 to atmosphere via vent cap 181, and shutting off vacuum from tank VT to establish closed condition of the valve SV. The other end of the flexible conduit 112 is connected to the fitting 195, and the other fitting 196 is connected to a flexible conduit 202 leading to a tubular fitting 203 threaded into an opening at the center of the upper end wall 204 of the vacuum storage tank VT. The lower end of this tank is fitted with an opening for reception of a threaded reduced extension 205 of the conventional one-way check-valve CV which seats in a direction opposing the source of vacuum production illustrated as the inlet-manifold IM of the engine E. The outer end of the check-valve has a rigid tubular fitting 206 to which is connected a flexible conduit 207 connected to a rigid tubular fitting 208 threaded into the manifold at 209.

The governor G comprises a cup-shaped housing 215 with an externally threaded projection 216 engaging the internal threads 217 of a bore 218 through an angular boss 219 integral with the vehicle transmission casing T, by means of a worm-gear connection 222, 223, the gear 222 forming the lower or inner end of a governor drive shaft 225. The upper end of the drive shaft projects from the gear through a longitudinal bore 226 through the projection 216 into the interior of the housing 215, and a riser 227 is connected to the shaft 225 by interconnected linkage 228 and a pair of diametrically opposed centrifugal members or weights 230, 231 whereby rotation of the members causes them to throw outwardly and inwardly with respect to the axis of the drive shaft to elevate and lower the riser in accordance with the rotational speed thereof.

The open end of the governor housing is closed by an insulative cover 235 incorporating a pair of terminals 237, 238 through the wall thereof and marginal holes 240 for reception of cap screws 241 threaded into lateral bosses 242 on the housing to secure the cover as a unitary assembly with the housing. Centrally disposed in the cover coaxially with the riser is a threaded opening 244 through which projects a plunger 245 backed by an adjustable preloaded compression spring 246 interpositioned between the plunger and a plug 247 threaded into the opening 244 whereby the spring pressure on the plunger may be varied according to the desired speed sensitive operation of a movable switch member 249 comprising the switch GS which is pivoted at 250 to the inner end of the terminal 238 and medially projects between the riser and plunger with the free end equipped with a contact 252 normally engaging a fixed contact 253 rigid with an angular portion 254 depending from the inner end of the terminal 237. The outer end of terminal 237 is fitted with a threaded double-nut 256 between which a terminal 257 of the conductor 169 is secured. The outer end of the terminal 238 is threadedly fitted with a double-nut 259 between which a terminal 260 of a conductor 261 is secured, said conductor 261 being connected at its other end to a movable contact 262 comprising the manual switch MS which finds patent equivalency in an ignition switch, and the fixed contact 263 of this switch is engaged by the free end of the movable contact to close the same. A conductor 265 leads from the fixed contact 263 to a terminal 266 of the storage battery B with the other terminal of the battery grounded by conductor 267 at 268, to thus form the electrical control system of the present invention with the components thereof in their relative operating positions illustrated in FIGURE 1 as follows: With the vehicle standing or operating at speeds at or below 10 to 15 m.p.h., the shut-off valve SV is in energized open position, thus connecting the vacuum tank VT via conduits 202, 112 to the master control valve MCV to enable power assistance from the servomotor SM to be available according to the manual turning movement of the steering wheel 10 in either direction from the neutral straight ahead driving indicated by solid lines of the wheels 71 to any selected degree of dashed line position right or left thereof.

A bracket 270 secured to the upper face of flange 189 by bolts 192 projects upwardly on the exterior of the shut-off valve assembly SV, for attachment to some portion of the vehicle such as the dash panel by cap screws 271 or otherwise to mount the valve assembly in an accessible position for connection to the other components comprising the present invention.

OPERATION

The manner in which my improved vacuum-operated steering mechanism functions is believed manifest from the foregoing description. However, in the interest of clarity a more detailed consideration will be given to its operational stages as follows:

Assuming a condition at any instant when the vehicle wheels 71 are aligned in straight ahead driving, the position of the power diaphragm 21 (see FIGURE 5) and linkage connecting the vehicle wheels thereto will be as shown in FIGURE 1 in solid lines, with the parts of the master control valve MCV in their relative positions corresponding to "Neutral" as depicted in FIGURE 2. At this instant, that is, with the control valve MCV in the position illustrated in FIGURES 1 and 2, the vacuum conducted from the tank VT to the valve housing via conduits 202, 112 is confined to the central annular chamber 143, and therefore, cut off from the annular chambers 140, 141 connected via ports 102, 103 and conduits 104, 105 to the servomotor chambers 110, 111, respectively.

Should the operator of the automotive vehicle or like machine having steered ground engaging members, desire to negotiate a turn to the "left," that is, deflect the steered members 71 to the left, as viewed (dashed lines) in FIGURE 1, it is only necessary for him to rotate the steering wheel 10 in a counterclockwise direction from the driver's viewpoint. Rotation of the steering wheel to the operator's left, produces an axial displacement rightward of the slide valve element 120 relatively to its housing 80, demonstrated in FIGURE 3, to place the annular chamber 143 in communication with the annular channel 105, port 103, conduit 107 and power chamber 111 of the servomotor SM to evacuate said chamber of air via conduit 112, open shut-off valve SV, conduit 202, and tank VT thus enabling atmospheric pressure on the opposite side of the power diaphragm 21 to move the latter rightward to actuate the steering linkage and connected wheels 71 in a leftward direction to steer the vehicle in that direction.

Figure 3:
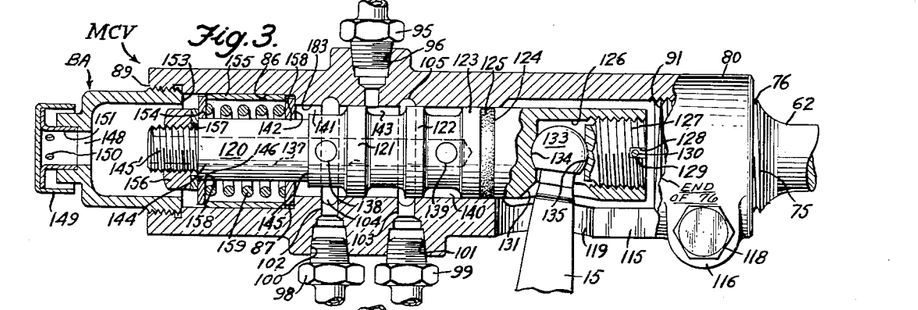
FIGURE 3 is a view similar to FIGURE 2 but showing the valve elements moved to cause the vacuum servo to assist in a left turn of the vehicle.

During such controlled displacement of the slide valve element 120 to the position of FIGURE 3, the other chamber 110 of the servomotor SM is connected to atmosphere via the conduit 106, port 102, annular channel 104, annular chamber 141, cross passageways 138, axial passageway 137, and breather assembly BA, while at the same time valve land 122 has isolated the cross passageway 139 from the annular channel 105. Movement of the slide valve element 120 rightward to the position shown in FIGURE 3 to cause the servomotor SM to assist in making a left turn, acts through the abutment ring 154 to disengage it from its co-operating shoulder 153 and additionally compress the centering spring 159 to provide a force opposing the manual movement of the steering wheel 10 to supplement the reactionary force from the vehicle wheels 71 to restore the valve 120 to balanced "neutral" condition as portrayed in FIGURE 2. This reactionary force increases substantially proportionally to the operator force applied at the steering wheel, thus if a further turning to the left of the vehicle is desired, the operator must increase his effort at the wheel to maintain the valve element in a position "cracking" the channel 105 controlled thereby so that the servomotor continues energized to assist in the execution of such left turn, whereupon the reactionary forces from the wheels 71 and spring 159 with release of the steering wheel induces relative movement between the valve housing 80 and slidable element 120 to restore balanced condition of the valve with respect thereto wherein the valve lands 121, 122 uncover the annular channels 104, 105 respectively in communication with cross passageways 138, 139 to place both chambers of the servomotor SM in communication with the atmosphere via breather assembly BA thus adjusting the power diaphragm 21 to its medially disposed de-energized position portrayed in FIGURE 5 if it is desired that the vehicle resume a straight path of movement, but if the steering effort is halted to keep the vehicle in an extended left curving path of movement, then the de-energized position of the power diaphragm 21 would correspond to such steered position of the vehicle wheels until a straight ahead course is desired.

For purposes of exemplification, only the operation and function of my vacuum-assisted steering system was explained for executing a left turn. For accomplishing a right turn, the steering wheel 10 would be rotated in a clockwise direction as viewed from the operator's seat in FIGURE 1, causing opposite relative positioning of the slide valve 120 with respect to its housing 80 as depicted in FIGURE 4 wherein the centering spring 159 is additionally compressed in the opposite direction by movement of the abutment washer 142 away from annular shoulder 87 and the firm seating of the abutment ring 154 against its cooperating annular shoulder 153 with the annular abutment face 157 spaced correspondingly to the left of the central opening through the ring 154. Thus, in like manner to the left turn, the centering spring 159 constantly urges the slide valve 120 and housing 80 toward balanced relative positions as portrayed in FIGURE 2, but while the slide valve 120 is maintained at any degree of "cracking" the annular channel 104 as shown in FIGURE 4, the servomotor SM diaphragm 21 is being urged leftward from its medial position as viewed in FIGURE 5 to turn the wheels rightward in co-operation with manual force exerted at the steering wheel. This differential pressure acting on opposite side of the power diaphragm 21 is created by evacuation of the air from power chamber 110 via the vacuum tank VT, conduit 202, open shut-off valve SV, conduit 112, annular valve chamber 143, annular channel 104, port 102, and conduit 106; and connection of the other power chamber 111 to atmosphere via conduit 107, port 103, annular channel 105, annular valve chamber 140, cross passageway 139, axial passageway 137, and breather assembly BA. Annular channel 104 being isolated from cross passageways 138 by valve land 121 while slidably displaced from its "neutral" position shown in FIGURE 2 to its operating position for a right turn as viewed in FIGURE 4. The sleeve stop 155 within which the centering spring 159 is operatively positioned, is effective to limit the slidable movement of the valve element 120 to its left and right turn operating positions portrayed in FIGURES 3 and 4 respectively by engaging the both stop washers 154 and 142 simultaneously, the length of the sleeve 155 being less than the space between the stop washers to provide a predetermined relative movement therebetween of the slide valve element 120.

Typical manual steering gear effort without power assistance requires a range of manual force at the steering wheel varying, for example, from approximately ten pounds to fifty pounds, to steer the vehicle at ordinary highway cruising speeds, cornering, and when parallel parking. It is, therefore, the purpose of the present vacuum-operated steering system to provide power assistance during low vehicular speed steering and when parking, the latter including turning of the wheels while the vehicle is standing, whereby substantially reduced effort at the steering wheel to as much as sixty percent of the full manual effort is provided through the full speed range of the vehicle or while standing. To this end, rating of the centering spring 159 becomes critical to establish approximately ten pounds manual effort at the steering wheel to overcome its preloaded status to enable movement of the slide valve 120 relatively to its housing 80 to either of its open positions portrayed in FIGURES 3 and 4, at which point power assistance is brought in to supply the additional working force to steer the wheels 71 in the direction desired irrespective of the condition of the terrain. Therefore, a novel advantage of the present steering system resides in the provision of substantially uniform manual effort at the steering wheel during low vehicular speeds and when parking, to correspond to normal effort in stabilizing the wheels 71 in alignment for straight ahead driving. It will be appreciated that centering spring 159 may be selectively rated according to the degree of manual exertion desirable for differently weighted vehicles and types of steered members utilzed thereon. Preferably the division of steering effort should be found practical with forty percent manual effort and sixty percent power assistance. Accordingly, the present vacuum steering system relies on part-time steering rather than full-time steering provided by present commercial designs, since the objectionable load factor is only present during low vehicular speeds and while parking, and safer vehicular control results at high speeds by restoring full manual control automatically.

The operativeness of the master control valve MCV to control the servomotor SM is rendered effective by opening the shut-off valve SV to enable vacuum from the tank VT to be selectively distributed to the power chambers 110, 111 responsive to rotation of the steering wheel 10. This shut-off valve is energized to open position as depicted in FIGURE 1 by closure of the switch GS at low vehicular speeds, 10 to 15 m.p.h., responsive to the speed of operation of the governor G as is understood. Upon increase in vehicular speed above the factors aforesaid, the governor weights are thrown further outwardly by action of centrifugal force thereon, and through the linkage connections cause the riser to elevate the movable contact of the switch GS and thus open the switch contacts causing the solenoid to be de-energized thereby releasing the armature and disc valve for upward movement to the dashed line position under the influence of spring 173 to close the port 200 thus isolating the vacuum tank VT from the master control valve MCV and rendering the vacuum system ineffective to assist in steering the vehicle in the manner previously explained. Accordingly, while the vehicle is out on the open highway operating at speeds above the predetermined range aforesaid, full manual control is restored automatically by the governor device G which eliminates any possiblity of loss of control due to "oversteering" at high vehicular speeds.

MODIFIED GOVERNOR CONTROL AND OPERATION

*(Figures 6, 7, and 8)*

In this modification wherein parts analogous to those already described are designated by like reference characters distinguished, however, by the addition of the letter "a" to each numeral and the exponent "1" to each letter, only closely associated structure of the steering system is shown, and it may be assumed that otherwise the components correspond to those of the embodiment first disclosed (FIGURES 1–5).

Figures 7, 12:
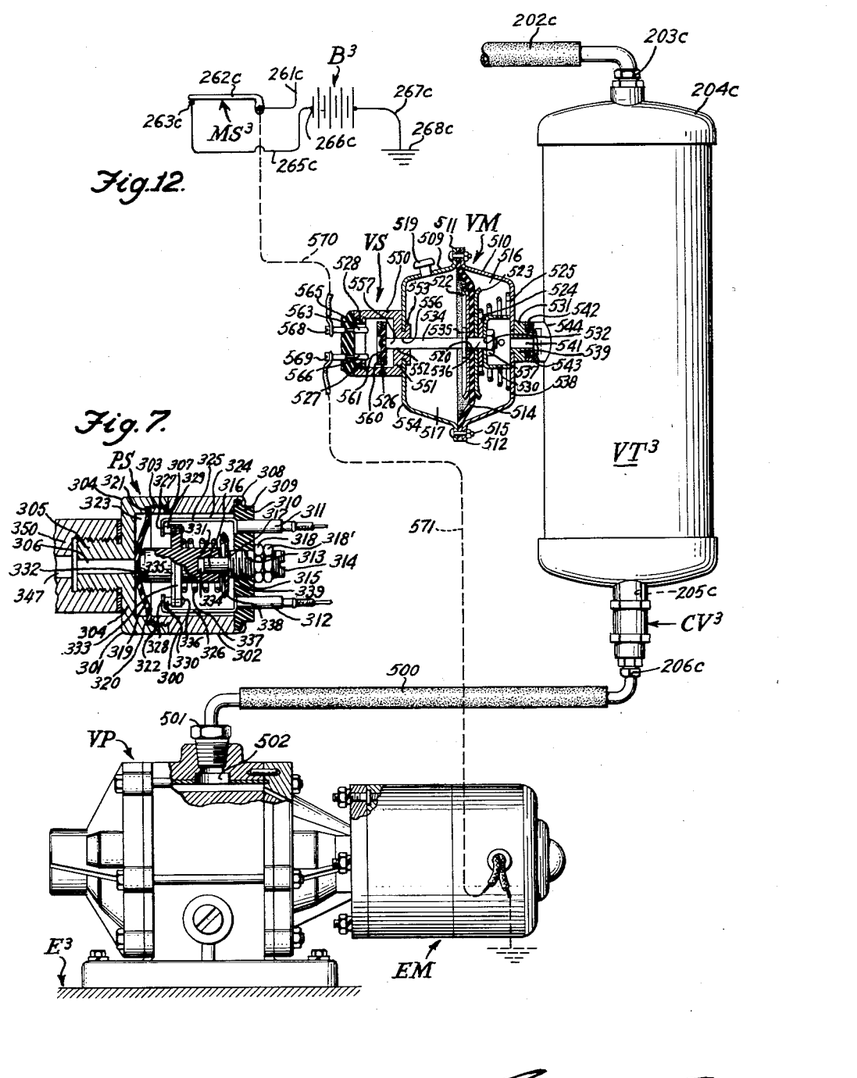
FIGURE 7 is a longitudinal sectional view on an enlarged scale through the fluid-pressure actuated switch of FIGURE 6, and showing details of the movable contact bridging the pair of fixed contacts to close the switch.
FIGURE 12 is a schematic view of another modification which utilizes an electrically driven pump for producing vacuum in lieu of the engine intake-manifold, said pump being adapted to store vacuum in a tank automatically controlled by pressure conditions within the tank acting on a pressure-responsive device to cause energization of the pump motor when the pressure within the tank rises to a predetermined factor, to lower the tank pressure and so maintain said low pressure vacuum for maximum operating efficiency of the steering servo. This arrangement also enables power assistance to steer the vehicle when the engine is not running to produce the required vacuum condition.

This modified embodiment of the present invention comprises a fluid-pressure actuated switch generally indicated at PS in lieu of the governor switch GS for controlling the opening and closing of the solenoid-controlled shut-off valve SV. Referring to FIGURES 6 and 7, the pressure switch comprises: a hollow housing 300 of preferably hexagonal cross section formed of two sections 301 and 302, the former section being cup-shaped with internal threads 303 adjacent the periphery of its open end and the end wall 304 has an externally threaded extension 305 projecting outwardly therefrom, said extension having an axial bore 306 therethrough communicating with the interior of said section. The other section has an externally threaded portion 307 adjacent one of its open ends for reception of the internal threads 303 on the cup-shaped section for joining the two sections as a unitary assembly, the other open end having its outer peripheral edge formed as an inturned annular flange 308 for securing an annular flange 309 formed on the periphery of an insulative cover member 310. Embedded in said cover are two electrical terminals 311 and 312, and centrally disposed in the cover is a threaded opening 313. An adjustable stop element 314 is provided with a threaded portion 315 which engages the threaded opening. A reduced extension 316 projects inwardly from the threaded portion into the interior of the assembled housing as shown. An annular shoulder 317 is formed at the juncture of the extension 316 and threaded portion with the outer end of the latter fitted with a nut 318 locked by a jam-nut 318'. A cross slot is provided in the outer end of the threaded portion for reception of a screwdriver bit to enable manual adjustments of said stop element to vary its axial projection into the switch housing when released by loosening the aforesaid nuts. A flexible diaphragm 319 is disposed adjacent the end wall 304 with its peripheral margin 320 clamped in fluid-tight sealing relationship between the inner peripheral ends 321, 322 of the threaded portions of the two sections to thus provide a fluid pressure chamber 323 between the end wall of the cup-shaped section and diaphragm, and an atmospheric chamber 324 between the opposite side of the diaphragm and insulative cover. Terminal extensions 325, 326 extend into the atmospheric chamber from the outer terminals 311, 312, respectively. The inner ends 327, 328 of the extensions 325, 326 are inturned at right angles in confronting disposition and fitted with contact elements 329 and 330 respectively. A movable contact assembly generally indicated at 331 is fabricated of insulative material as a cylindrical member 332 with a medially disposed integral external annular flange 333, the end of the member 332 adjacent the inner side of the insulative cover is blind bored at 334 for reception of the reduced end 316 of the stop element 314 and the other end engages the diaphragm, a peripheral face portion of the flange 333 carries a ring conductor 335 secured thereto as by rivets 336, said ring being adapted to span the fixed contacts 329, 330 to close the electrical circuit through the switch, and a normally preloaded compression spring 337 is operably disposed in engagement with the opposite face of the flange 333 with its other end supported by a cup-shaped seat 338 having a central opening 339 through which the stop extension 316 projects to enable the seat 338 to engage the shoulder 317 whereby adjustment of the stop element 314 also modifies the preloaded rate of the spring 337, the biasing action of said spring causing the contact assembly 331 to move to bridging closed position as shown in FIGURE 7 when fluid pressure on the opposite side of the diaphragm is substantially counterbalanced thereby.

Figures 8, 11:
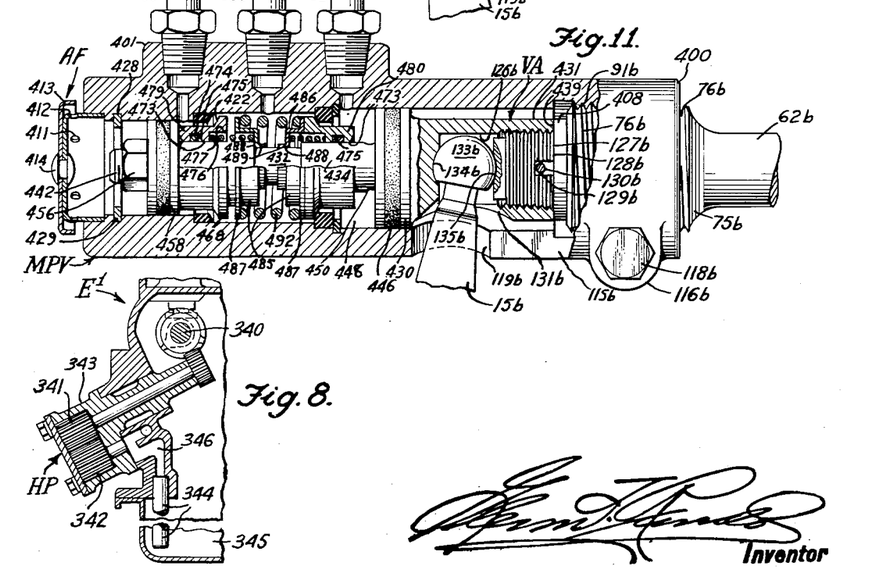
FIGURE 8 is a vertical sectional view at substantially right angles to FIGURE 6 showing details of conventional lubricating pump gears, drive connection with the engine camshaft, and oil sump.
FIGURE 11 is another operated view of FIGURE 9 showing the valve elements in the position of causing the vacuum servo to assist in a left turn of the vehicle.

A hydraulic pump HP is operably associated with the pressure switch PS, and is exemplarily depicted in FIGURES 6 and 8 as typical of such pumps driven from the camshaft 340 of the engine E (see FIGURE 8) for lubricating the moving parts thereof under pressure, or similar pump installations mounted on the exterior of the engine or driven independently by an electric motor for operating hydraulic steering systems, or driven from the tailshaft of commercial hydraulically-actuated automatic transmissions. A conventional pump design is illustrated comprising shaft mounted intermeshed drive and driven gears 341, 342 rotatable within a housing 343 provided on its interior with a wall in close adjacency to the periphery of the gear teeth, a suction pipe 344 in constant communication with an oil sump 345 and the pump intake port 346, a pressure passageway 347 connected to the pump pressure discharge port 348 and communicating with the axial bore 306 leading to the fluid chamber 323 of the switch, a boss 350 having internal threads for reception of the threaded extension 305 to thus mount the pressure switch assembly PS for operation by the pump, a pipe 351 leading from the passageway 347 to the moving parts of the engine, and another pipe 352 leading from the passageway 347 to the oil sump via a spring-loaded pressure regulator valve RV of conventional construction.

In operation, it will be assumed that the engine E is running causing the pump HP to develop pressure in hydraulic lines leading to the various moving parts to lubricate the same. The maximum pressure effective in the lines is determined by the pressure regulator valve RV. The pressure developed by the lubricating pump HP substantially at idling speed of the engine is insufficient to move the switch diaphragm 319 to actuate the movable contact 331 to break the connection between the pair of fixed contacts 329, 330, consequently the solenoid-controlled shut-off valve SV is energized to open position during such low-speed operation of the engine enabling vacuum to exhaust the air from the vacuum conduits and selected chamber of the servo-motor SM according to the direction of steering wheel movement inducing movement of the valve element of the master control valve MCV to selectively effect such connections with the servo-motor to provide power assistance to steer the wheel in such selected direction.

Accordingly, the speed of the engine translated into hydraulic pressure produced by the pump HP acting on the switch PS controls the opening and closing of the solenoid-controlled shut-off valve SV to enable the servo-motor SM to assist manual steering effect. When pressure is developed sufficiently by the pump due to increased speed of the engine above idling operation, such pressure will act on the switch diaphragm 319 via liquid passageway 306 to move the contact 331 out of engagement with the fixed contacts 329, 330 and thus open the switch to de-energize the electrical circuit in which the solenoid of the shut-off valve is interposed in series therewith. Opening of the switch PS is thus accommodated at a predetermined engine speed above idling speed, causing the power controls of the steering system to be disabled and thus revert automatically the control of the steering of the vehicle to full manual operation as is understood.

With this modified arrangement the same advantages are provided as by the first embodiment (FIGURES 1–5) with respect to power assistance at low vehicular speeds and when parking which becomes completely disabled after the automobile is cruising at or above approximately 10 to 15 m.p.h. Accordingly, when extra force is required to turn the vehicle wheels, power assistance is automatically made effective, but when on the open highways where driving reduces manual effort on the steering wheel to a minimum, power assistance is rendered ineffective to provide the drive with normal steering "feel" for better and safer control of the vehicle at such higher speeds. The present invention contemplates providing the driver with exertion of substantially uniform manual force throughout the full driving range of the vehicle.

MODIFIED MASTER CONTROL VALVE AND OPERATION

*(Figures 9, 10, and 11)*

This modification of the invention substitutes a pair of movable poppet-type elements for the slidable spool-type element 120 illustrated in FIGURES 1–4, and parts analogous to those previously used are designated by like reference characters distinguished, however, by the addition of the letter "b" to each numeral and the exponent "2" to each letter, and it may be assumed that otherwise the components correspond to those of the first embodiment (FIGURES 1–5).

Figure 9:
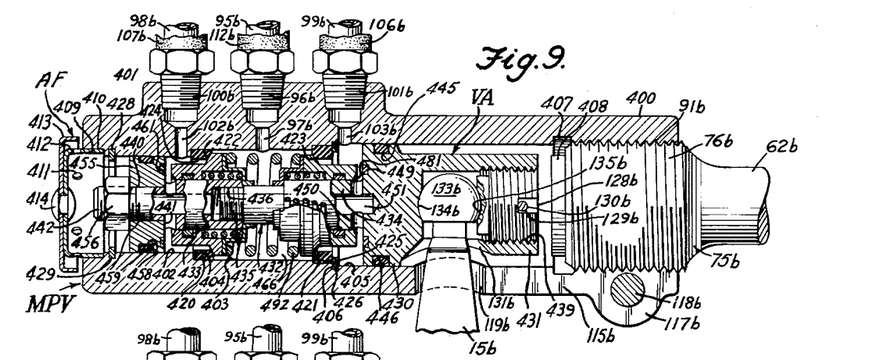
FIGURE 9 is a longitudinal horizontal section of a modified main control valve which utilizes a pair of opposed poppet-type valve elements and shown in the position corresponding to FIGURE 1.

This modified poppet control valve generally designated "MPV" comprises: a hollow cylindrical housing or body 400 medially formed on its exterior with a substantially rectangular longitudinal embossment 401, fitted in spaced alignment with tubular fittings 98b, 95b, and 99b threaded into bores 100b, 96b, 101b communicating with ports 102b, 97b, and 103b through the body wall, respectively, communicating with the interior, a longitudinal bore 402, a medially disposed counterbore 403 forming an internal annular shoulder 404 with the bore 402, another counterbore 405 merging with the first-mentioned counterbore to provide an annular internal shoulder at 406, an annular groove 407 provided in the counterbore 405 with the terminal portion threaded at 91b to receive the enlarged threaded end 76b of the center link 62b for assembly of the valve body to the steering linkage. A reduced extension 408 projects inwardly from the end 76b. A terminal recessed portion 409 of the bore 402 is fitted with a cup-shaped breather member 410 having air holes 411 through the cylindrical wall adjacent the outer end wall 412 thereof, and a cup-shaped baffle member 413 is telescopically disposed on the exterior of the end wall as by a rivet 414, with the cylindrical portion thereof in spaced circular alignment with the holes 411 to thus produce an air filter assembly generally designated AF to enable air to communicate with the interior of the valve body.

A pair of ring members 420, 421, preferably made of plastic or fibre material, are disposed in the counterbores 403, 405, respectively, in longitudinally spaced relation in engagement with the annular shoulders 404, 406, respectively, with member 420 pressfitted in said counterbore 403 to stabilize it against shoulder 404. Portions of the confronting sides of said members are fabricated as angular, preferably conical, fixed valve seats 422, 423, respectively, with each member having a central opening 424 in coaxial disposition. A split retainer ring 425 engages an internal annular groove 426 provided in the surface of the counterbore 405 adjacent the opposite side of the ring member 421 to stablize this ring in its operative position shown in FIGURE 9. An annular internal groove 428 is provided at the outer terminus of the longitudinal bore 402 for reception of a split retainer ring 429. A slidable valve actuator generally designated VA is disposed in the hollow of the valve body coaxially disposed with respect thereto, and operably projects through the openings 424. This actuator comprises: an intermediately disposed integral annular flange 430 having a rightward projecting reduced cylindrical extension 431, and a leftward projecting reduced cylindrical extension 432 comprising two coaxial cylindrical sections 433, 434. Section 434 terminates with a reduced diameter portion 435 having external threads engaging internal threads formed in a counterbore 436 in the confronting end of the section 433 to rigidly join the normal diameters of these sections in spaced relation as defined by the exposed smooth portion of 435. An annular shoulder 437 is provided at the juncture of the portion 435 with section 433, and another confronting shoulder 438 spaced from shoulder 437 is provided by the reduced diameter portion 435 of the section 434. This composite arrangement of extension 432 is requisite to assembly of the valve parts as will appear. Extension 431 is adapted in the identical manner to the first disclosure (FIGURES 1-4) for reception of the ball end 133b of the pitman arm 15b to provide a universal connection therebetween with the end 439 of the extension 431 spaced from the stop 408 as shown in FIGURE 9 when the control valve MPV is in "neutral" condition corresponding to straight ahead or halted steering control during a turn. Displacement of the valve actuator VA rightward through its full operating stroke, as shown in FIGURE 11, brings the end 439 into engagement with the stop 408 to limit the operating stroke of the actuator in that direction, and thus enable direct manual steering in the event of partial or complete failure of power assistance as is understood. When the servomotor SM is assisting in the steering effort, the end of the valve actuator is spaced from the stop 408 in varying degrees as will appear. The outer end of the section 433 terminates into a reduced diameter portion 440 forming an annular shoulder 441 therewith with the end of the reduced portion externally threaded at 442.

The flange 430 is fitted with an external annular groove 445 and a flexible sealing member 446 carried therein in engaging contact with the surface of the counterbore 405 to provide an air-vacuum chamber 448 between the confronting sides of the flange and ring member 421. Embedded in the inner side of the flange and encircling the extension 432 is a washer-type valve seat 449, and adjacent this seat, radial air ports 450 are provided in the extension 432 for communicating with an axial passageway 451 extending from the outer end thereof to a point in circular alignment with flange 430, and similar radial ports 452 are provided adjacent the shoulder 441 communicating with the axial passageway aforesaid. A detachable collar member 455 is fitted on the threaded portion 440 against the shoulder 441 and rigidly secured together by a nut 456 drawn tight on the threaded portion against the opposite side of the collar to enable conjoint movement of the collar with the actuator extensions. This collar carries an external annular groove 458 in its peripheral surface fitted with a flexible sealing member 459 engaging the surface of the longitudinal bore 402 in air-tight sealing relationship to provide an air-vacuum chamber 460 between the confronting sides of the collar and ring member 420. A washer-type valve seat 461 similar to seat 449 is embedded in the inner face of the collar.

A pair of identical sleeve-type valve elements 463, 464 are slidably fitted in air-tight sealed relationship on the extension 432 in longitudinally spaced relation to provide an annular vacuum chamber 466 therebetween, with their opposed ends adapted to project through the openings 424. The inner confronting ends of the elements are formed with annular flanges 468, 469 having angular faces 470, 471 for co-operating with the seats 422, 423, respectively. Bores 473 through these sleeve elements are fitted with an internal annular groove 474 which carry piston ring seals 475 in encircling disposition with respect to the extension 432 to appropriately effect the aforesaid sealing relationship therebetween. The confronting ends are provided with a counterbore 476 forming a shoulder at 477 with the bores 473. The opposed ends 479, 480 of the sleeve elements are chamfered at 481 and adapted to engage the washer seats 449, 461 to selectively isolate radial ports 450, 452 from their respective chambers 448 and 460 when the actuator is moved to operating positions shown in FIGURES 10 and 11, respectively, to cause power-assistance by the servomotor SM.

The confronting ends of the sleeve valve elements are each engaged by an annular spring seat 485 which encircles the extension 432. This spring seat comprises a hollow cylindrical portion 486 spaced from said extension, provided with an outturned annular flange 487 adapted to normally bear on the end face of the sleeve elements, an inturned annular flange 488 forming the inner end of the seat, and a reduced cylindrical portion 489 projecting inwardly from the inturned flange to serve as a bearing support for the spring seat on the reduced portion 435 with the shoulders 437, 438 normally engaging the inner marginal portion of the inturned flange 488. Assembly of the pair of annular seat members in confronting relationship between the shoulders 437, 438 on the portion 435 is effected before the sections 433, 434 are threaded together as previously explained. A normally preloaded compression spring 490 reacts between the shoulder 477 and flange 488 of each of the two spring seats 485 tending to bias the valve elements 463, 464 apart. These two springs encircle the cylindrical sections 433, 434 respectively which serve as guides to prevent disalignment of the spring coils. Another normally preloaded helically formed compression centering spring 492 is operably disposed in encircling relation with respect to the seats and extension aforesaid with its ends reacting on the confronting side of the outturned flanges 487 to thus overcome the springs 490 and bias the seat 485 and co-operating valve elements into engagement with their respective seats 422, 423 to dispose the control valve MPV in balanced (closed) condition corresponding to straight ahead driving with the steering mechanism in the position of FIGURE 1.

Port 97b is adapted to communicate with vacuum chamber 466, and ports 102b and 103b communicate with chambers 460 and 448 respectively. Flexible conduit 106b is connected to fitting 99b and the other conduit 107b leading to the servomotor SM is connected to fitting 98b, whereby operation of the control valve MPV to its two operating positions portrayed in FIGURES 10 and 11 causes the power diaphragm 21b to reciprocate to assist in turning the vehicle wheels according to the rotational movement of the steering wheel 10.

In operation, counterclockwise rotation of the steering wheel 10 displaces the valve actuator VA rightward relatively to the valve body as viewed in FIGURE 11 to first bring the valve seat 461 into engagement with the valve element end 479 to close radial ports 452 and thus isolate chamber 460 from atmosphere. At the same time shoulder 437 acts on the inturned flange 488 of the annular spring seat 485 to space the outturned flange 487, with increased tension created in the spring 492 acting on the other valve element 464, from the ring member 420 as shown in FIGURE 11, thus enabling spring 490 to relax slightly while continuing to bias the valve element 463 into seated relationship with its cooperating seat 422 to thus maintain this valve closed. Additional displacement of the valve actuator rightward displaces the valve element 463 in unison with the collar 455 to the position of FIGURE 10 for a full working stroke thereof, if desired, with the end 439 engaging the stop 408, whereby further manual movement of the steering wheel to the left enables direct manual operation of the steering linkage, in the event of partial or complete failure of the servomotor SM to operate. Accordingly, the valve element 463 is unseated placing the vacuum chamber 466 in communication chamber 460, thence port 102b, conduit 107b, and power chamber 111 to evacuate the latter of air and thus cause differential pressures on opposite sides of the power diaphragm 21 to move it rightward as viewed in FIGURES 1 and 5 to provide power assistance from the servomotor to steer the vehicle to the left. During this actuation of the servomotor, the other power chamber 110 thereof is maintained vented to atmosphere via conduit 106b, port 103b, chamber 448, radial ports 450, axial passageway 451, and breather assembly AF.

From the foregoing description of the operation of my improved modified control valve, it is seen that the single centering spring 492 applies increased tension on the closed valve element when the other element is unseated (open) causing a selected operation of the servomotor, to insure that the closed element is properly seated to prevent loss of vacuum from chamber 466. This spring also acts sequentially from the operating positions shown in FIGURES 10 and 11, through the tubular seats, acting on whichever shoulder 437, 438 is engaged therewith to center the valve actuator and associated steering linkage with respect to the valve body in balanced "Neutral" condition as portrayed in FIGURE 9 and to bias the open valve element to seated closed position, and thereafter maintain both valve elements and valve actuator in balanced "Neutral" position in readiness for another power assisted steering cycle in the direction desired.

Figure 10:
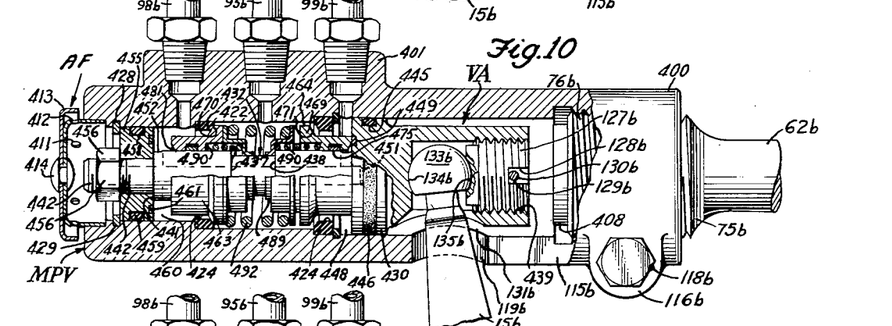
FIGURE 10 is a view of FIGURE 9 showing the valve elements in the position for causing the vacuum servo to assist in a right turn of the vehicle.

The two identical springs 490 which react on the inturned flanges 488 and shoulders 437, 438, respectively, tending to force them apart, possess novel characteristics in that when the force of the heavier centering spring 492 is withdrawn from the selected valve element to be opened to cause power assistance according to the rotation of the steering wheel, the spring 490 associated with that element maintains the element on its seat, best demonstrated in FIGURES 10 and 11, while the associated atmospheric valve comprises either valve seat 461, valve end 479, and radial ports 452, or valve seat 449, valve end 480, and radial ports 450 depending on which valve element is being opened. Thereafter, the seated contact between the ends 479 or 480 of the valve elements 463, 464 with their co-operating washer seats 461 and 449 enable conjoint movement of the sleeve element with the valve actuator by either the collar 455 or flange 430 as the case may be, to open position shown in FIGURES 10 and 11 respectively. Accordingly, springs 490 perform the important and novel function of enabling closure of atmospheric ports 450, 452 prior to unseating (opening) the valve elements 463, 464 to keep the vacuum confined within chamber 466, and during selective closure of the valve elements aforesaid by action of the centering spring 492, springs 490 insure that the active valve element will be properly seated (closed) prior to opening of the associated atmospheric valve aforesaid. With this novel spring arrangement, a slight overlap is maintained between the pairs of vacuum and atmospheric valves to completely isolate the atmosphere from vacuum and vice versa during selective operation of the poppet elements 463, 464. For purpose of exemplification only the operation and function of this modified steering system has been explained for executing a left turn. For accomplishing a right turn the steering wheel 10 would be rotated clockwise from the driver's viewpoint in FIGURE 1 causing the valve actuator VA and associated parts to assume the positions shown in FIGURE 10 wherein the servomotor chamber 110 is evacuated via connected ports 97b and 103b with radial ports 450 closed and the other chamber 111 subjected to atmospheric pressure via conduit 107b, port 102b, chamber 448, radial ports 452, axial passageway 451 and breather assembly AF.

This modified valve structure has a wide range of applications for controlling pressure differential motors, such as, for example, the illustrated servomotor SM, responsive to a personally-operated member herein illustrated by way of example, as the steering wheel 10 of a motor vehicle. The single centering spring 492 serves to adjust the moving parts to centralized "Neutral" positions with respect to the valve body and movable valve elements in effectively sealed relation, and which, by reason of their self-sealing characteristics provide long service life free of adjustments and replacements of sealing members due to wear. In fact, any type of follow-up power control responsive to a personally-operated member may be readily accomplished efficiently with this modified valve structure whether the fluid medium be super-atmospheric or sub-atmospheric.

MODIFIED VACUUM PRODUCTION SYSTEM
AND OPERATION
(*Figure 12*)

This modification of my invention substitutes a motor driven vacuum pump VP for the engine intake manifold IM as a source of vacuum production, and similarly to the other modifications parts analogous to those previously used are designated by like reference characters distinguished, however, by the addition of the letter "c" to each numeral and the exponent "3" to each letter, otherwise the components correspond to those previously disclosed.

This arrangement comprises an electric motor "EM" connected in series with the battery $B^3$, master switch $MS^3$, a vacuum-actuated switch VS, and a ground conductor. The motor EM is coaxially disposed with respect to the rotor shaft of a vacuum pump designated VP and drivingly connected thereto whereby energization of the motor operates the pump to evacuate a storage tank $VT^3$ having a one-way check-valve $CV^3$ with a rigid fitting 206c which in turn is connected to the pump via a conduit 500, rigid tubular fitting 501 and inlet port 502, and at its opposite end to shut-off valve SV via rigid tubular fitting 203c in the upper end wall 204c of the tank and conduit 202c whereby constant communication between the tank $VT^3$ and shut-off valve SV is established. A reduced threaded extension 205c at the upper end of the check-valve $CV^3$ interconnects the latter with a complementally threaded opening in the lower end of said tank to establish communication between the check-valve and interior of the tank. The tank is fitted on its exterior with a vacuum-actuated motor VM adapted to actuate the switch VS. This motor is the diaphragm-type comprising: two dish-shaped casings 509, 510 with confronting peripheral outturned flanges 511, 512, respectively, between which the peripheral margin of a flexible power diaphragm 514 is secured in air-tight sealed relation by a plurality of bolts 515 to provide a pressure chamber 516 and an atmospheric chamber 517, the latter being vented to atmosphere by vent 519. A central opening 520 is provided in the diaphragm, and the clamping plates 522, 523, and a spacer washer 524 having corresponding registering holes. A normally preloaded conical compression spring 525 is disposed within chamber 516 between the diaphragm plate 523 and end wall for biasing the movable contact 526 toward bridging (closed) relation with respect to the two fixed contacts 527, 528. A cup-shaped stop member 530 is provided in coaxial disposition with respect to the above registering holes with an end wall 531 having a central opening 532 in registry with the above holes. An actuator rod 534 with an annular flange 535 spaced from a threaded end 536 is adapted to project through the said holes and be secured as a unitary assembly with the diaphragm by a nut 537 whereby the actuator rod and diaphragm move together. The open end of the stop member 530 engages the inner side of the end wall 538 of casing 510. A boss 539 projecting coaxially from the casing 510 is provided with a central passageway 541 adapted to communicate with the interior of the tank. This boss has a threaded portion 542 engaging a threaded portion 543 in a complemental boss 544 secured to the exterior of the tank as by welding to attach the motor VM in operative position on the tank. The switch VS comprises a casing 550 of cup-shaped configuration with its bottom wall 551 centrally apertured at 552 and surrounded by a projection 553 secured to the exterior of the end wall 554 of the casing 509 so that registering aperture 556 in the end wall 554 enables the outer end 557 of the rod 534 to project therethrough into the interior of the switch housing. The outer end of the rod projecting into the switch VS is fitted with an insulative disc 560 provided on its face periphery with an annular metallic ring contact 561. The open end of the switch housing is threadedly fitted with an insulative cover 563 in which is embedded fixed contacts 565, 566 adapted to be bridged by the ring contact when pressure increases within the tank to a predetermined factor. The contacts 565, 566 project through the cover to the exterior thereof as terminals 568, 569, respectively to which conductors 570, 571 are connected. A one-way check valve CV³ is provided at the inlet of the tank to prevent back pressure from working against the vacuum pump or loss of vacuum via the pump when not operating. This check-valve is conventional in all respects and may be of any commercial design and therefore a detailed structural depiction is believed unnecessary.

In operation, assuming the vacuum tank VT³ evacuated substantially of air (maximum vacuum condition) causing differential pressures across the diaphragm 514 to move the diaphragm to the position shown in this figure wherein the movable contact 560 is withdrawn out of engagement with the fixed contacts 565, 566 thus opening the switch VS and connected electrical circuit to stop the motor EM causing a cessation in the production of vacuum by the vacuum pump VP. Under these conditions the vacuum tank VT³ is sufficiently evacuated of air to efficiently operate the servomotor SM to assist in steering the vehicle in the manner previously described in connection with the first disclosure (FIGURES 1–5). However, when air pressure in the vacuum tank increases, thus lowering the vacuum efficiency, to a predetermined factor, air is evacuated from pressure chamber 516 of the motor VM enabling the substantially counterbalancing of pressures effective on opposite side of the motor diaphragm 514 augmented by the biasing action of the spring 525 to move the contact 560 into engagement with the fixed contacts 565, 566 and thus close the switch VS thus causing the motor EM to drive the vacuum pump VP and restore the evacuated condition of the tank VT³ back to normal vacuum efficiency.

From the foregoing description, it is manifest that this modified arrangement for producing vacuum to operate the servomotor SM is of practical nature, in lieu of the vacuum created within the inlet-manifold IM during engine operation, by maintaining a substantially uniform vacuum condition within the tank VT³ for utilization to energize the steering assistor SM even when the engine is not running and steering of the vehicle is required while towing or pushing the vehicle. The one-way conventional check-valve CV³ interposed in the conduit connecting the inlet port of the vacuum pump VP to the tank, is effective at all times to trap the vacuum ahead of the vacuum pump and thus prevent back pressure and vacuum losses.

OPERATIONAL SUMMARY

From the foregoing description, taken in connection with the various illustrations of the different embodiments of my invention, it will be seen that certain interrelated components of the steering control system possess similar functional characteristics such that interchangeability is readily effected, particularly in connection with the master control valves MCV and MPV, and the governor switch GS and pressure switch PS. For example, either of the switches GS and PS is adaptable to disable the power assistance through the shut-off valve SV, responsive to the speed of the engine E, transmission tailshaft, or any member responsive to the speed of a rotating element serving the same purpose as the pump HP or governor G. A further example is illustrated in FIGURE 5 wherein the servomotor SM has a movable power member of the flexible diaphragm type whereas this member may be a solid piston assembly controllable with substantially equal efficiency by either of the master control valves aforesaid, each of these assemblies being a reasonable equivalent for the other in the patent sense.

Accordingly, the aforesaid components of the present novel construction afford different commercially desirable combinations by selectively combining the different components according to the requirements for the particular type of motor vehicle, that is, whether commercial, military, or for pleasure. Further beneficial results in the steering control of a motor vehicle equipped with my vacuum-assistor may be realized in the interposition of the master control valve MCV or MPV in either the center link of the steering linkage or directly associated with the steering pitman arm and cross shaft adjacent the steering worm-gear.

The vacuum production system illustrated in FIGURE 12 may be employed to operate other servomotor-operated power accessories on the vehicle, such as the windshield wiper, top folding mechanism, seat adjuster, radio antenna, power-brakes, vacuum transmission shifter, vacuum-operated clutch, etc.

It is further contemplated by the present invention that the fluid medium may be sub-atmospheric, super-atmospheric or hydraulic, and in the case of the latter which is characteristic of presently well known commercial power steering devices, the speed-responsive disabling mechanism which includes the shut-off valve SV controlled by either the governor G or hydraulic pump HP, is readily adaptable to such hydraulically controlled steering gears.

The vacuum tank VT of the vacuum system of the present invention may be excluded to place the master control valve MCV or MPV in direct communication via the open shut-off valve SV with the engine inlet-manifold IM. This arrangement, however, while enabling maximum limited power assistance with the engine idling as shown in FIGURE 1, only slight opening of the throttle in an engine accelerating direction can be utilized due to resultant increase in pressure within the engine manifold. Accordingly, power assistance would be available only at extremely low vehicular speeds not exceeding 5 m.p.h. and when parking only minimum throttle could be used if power assistance is made available to any appreciable degree. Otherwise, the system would function in the same manner as explained above.

The governor device, whether of the centrifugal or pump type illustrated in FIGURES 1 and 6 respectively, provides two vehicular speed ranges of power assistance control whereby manual steering effort is maintained substantially proportional to the turning resistance of the wheels on the road whether parking or cruising, within limits, for example, of between 5 to 10 pounds at the steering wheel 10. That is to say, the manual effort required for turning the vehicle while cruising is not appreciably increased when turning at low vehicular speeds or while parking the vehicle. In the low speed range, however, power assistance is effective; while in the high speed range, power assistance is disabled automatically by the governor device reverting the steering control solely to manual effort with no appreciable increased burden on the operator over that exerted during the low speed range of the vehicle. Thus, the operator is provided with full manual control during open highway driving where high speeds are utilized, for predictable and safer control of the vehicle without the danger of oversteering resulting from over-sensitivity of present commercial power steering systems.

In accordance with the present disclosure, it will be noted that the elements comprising the control valve MCV or modified form thereof indicated at MPV, are telescopically related whereby relative movement of the parts connected to and actuated by the steering arm 18 with respect to the parts connected to the steering linkage, induce corresponding incremental movements of the associated power device SM to simulate what may be termed "follow-up" control, and upon halting movement of the steering arm at any position thereof in the full range of steering control, the centering spring 159 or 492 establishes the parts in relative valve closed positions as portrayed in FIGURES 2 and 9 thus disabling further operation of the power device from the position corresponding to such bolted position of the steering wheel, to thus prevent any possibility of "over-steering." Stated differently, the power device SM co-operates with the manual turning of the steering wheel to turn the road wheels 71 to the exact degree of the steering wheel position without any tendency of one overlapping the other.

The vacuum-assisted steering apparatus herein disclosed is designed primarily to assist in parking or negotiating rough terrain at very low speeds of the vehicle. Therefore, in the absence of road reaction whether on a turn or driving a straight course, the main control valve automatically adjusts to an "off" closed position wherein the servomotor SM is inactivated when steering effort at the wheel is relaxed substantially. However, it should be noted that while the servomotor assist in turning the dirigible wheels 71 of the vehicle appreciably reduces driver turning effort in executing a right or left turn, the higher the resistance to turning between the roadbed and the front wheels, the more the control valve is displaced to an "on" open position, since the amount of valve displacement and, consequently, the amount of pressure differential effective in the servomotor is dependent upon the resistance to turning. In this way the driver is helped by smooth vacuum-power assistance to steer the vehicle but when he ceases to apply steering effort to the steering wheel and then relaxes the wheel, the control valve is forced back automatically to its "off" closed position by the centralizing spring 159 or 492 therein and the road reaction through the steering linkage, to place the front wheels on a straight course. When this happens, pressures on opposite sides of the power diaphragm 21 are balanced to inactivate the servomotor SM and the steering geometry of the vehicle causes the wheels 71 to return to their straight-ahead position.

Another novel arrangement and operation ensue from the present invention where the electrical circuit which includes the shut-off valve SV, governor switch GS, and governor device G are eliminated from FIGURE 1, thus converting the system to an all-mechanical-type. In such case the control valve MCV or MPV as the case may be, is connected directly to the vacuum tank VT with the source of vacuum production being the inlet-manifold IM connected to the tank via the one-way check valve CV. This modified system enables the operator to have power assistance during those times that the engine is idling and for a predetermined period of operation while the throttle is opened in an engine accelerating direction, particularly for low speed vehicular acceleration such as needed during parking, or negotiating slow turns, etc. The vacuum (reduced pressure) trapped in the tank ahead of the check-valve enables limited power-assistance while the throttle is open beyond idling position. However, upon reaching higher vehicular speeds the open position of the carburetor throttle valve would be such as to cause the pressure to raise within the inlet-manifold as is understood due to air velocity rather than vacuum created as when the throttle is closed. Accordingly, with the vacuum exhausted from the tank at open throttle conditions during vehicular cruising, operation of the servomotor SM to assist in the manual steering effort is substantially disabled reverting the steering operation to full manual control. Thus, in effect, this novel arrangement provides novel disabling means for the power means SM automatically effective at open throttle after the trapped vacuum in the tank has been utilized. Upon release of the engine throttle back to idling position, the tank is again evacuated of air in readiness for another cycle of power energization of the steering operation responsive to manual effort applied at the wheel 10.

The two systems of vacuum production demonstrated in FIGURES 1 and 12 are noteworthy since both of these systems provide economical means of producing and storing vacuum without adding to engine load. The storage tank VT provides ample vacuum conditions for operating the vacuum booster SM for a limited period independently of vacuum production by either the engine or the electrically driven vacuum pump and also insures uniform effectiveness of the steering booster device SM. When the engine is operating, sub-atmospheric conditions prevail within the inlet-manifold IM to maintain the tank VT evacuated of air, and in the case of the second embodiment (FIGURE 12) the vacuum pump VP is fully automatic in its operation to maintain the tank properly evacuated, thus insuring a stable vacuum condition for energizing the steering servomotor SM responsive to manual movement of the steering wheel 10. In the broader aspects of the present invention, these two described and illustrated systems for creating vacuum may also be utilized to produce compressed or super-atmospheric conditions for energizing the steering servomotor SM, and the invention contemplates this broader concept in the patent sense.

Considering the terminology used in the foregoing description and in the appended claims, the identifying expressions and/or terms employed are intended to convey meanings which include the range of reasonable equivalents in the patent sense. For example, the expressions "servomotor," "servomechanism," "power cylinder," "power-operated mechanism," "power device," "assistor," "power-assistor," "vacuum assistor," "differential-pressure actuator," etc., are intended to include any casing and/or chamber have a pressure-responsive movable assembly therein, whether such assembly includes a solid piston, or a flexible diaphragm, or some other member serving the same purpose. The terms "front," "rear," "right," "left," "straight ahead," "up," "down," "bottom," "top," and other directional words or characters are intended to have only relative connotation for convenience in describing the structure as illustrated, and are not intended to be interpreted as requiring any particular orientation with respect to associated structure external to the present disclosure except such terms as may designate the path of movement of the vehicle.

Although it will be apparent that the preferred embodiments of the invention herein disclosed are well calculated to fulfill the objects above stated, it will be appreciated that I do not wish such to be limited to the exact construction and/or arrangement of the cooperating parts shown, since it is evident that modifications, variations, changes, and substitutions may be made therein without departing from the proper scope or fair meaning of the subjoined claims.

Having thus described my invention, I claim:

1. In a vacuum booster mechanism for use on a vehicle having an engine, a drive line, steered elements and a manual steering element therefor comprising: a fluid-pressure operated power cylinder; a power member reciprocable in said power cylinder from a normal medial neutral position with respect thereto and dividing the interior of said cylinder into two variable pressure compartments, one on each side of said power member; a pivotal connection between said power cylinder and a portion fixed to said vehicle; another pivotal connection between said power member and one of said steered elements; steering control valve means having a pair of telescopically-related relatively slidable elements, one of said valve elements being connected to one of the steered elements and the other valve element being connected to the steering element; a vacuum chamber disposed between said valve elements in constant communication with a vacuum supply conduit; a pair of air air-vacuum chambers disposed between said valve elements, one on each side of said vacuum chamber in longitudinally spaced relation thereto, said air-vacuum chambers being normally connected respectively to opposite ends of said power cylinder and to atmosphere to establish balanced pressures on opposite sides of said power member for power-inactivation of said power cylinder; an air vent in said outer valve element; an axial passageway in one of said valve elements closed at one end and open at the other in constant communication with said air vent; a pair of cross passageways intersecting said axial passageway in communication respectively with said air-vacuum chambers to vent the latter to atmosphere; spring means having a normally preloaded spring reacting between said valve elements to establish the normal neutral position thereof; limiting means operably incorporated between said valve elements to define the limits of the relative operating movements of said valve elements in opposite directions from said neutral position thereof to selectively isolate said air-vacuum chambers from atmosphere and connect the isolated one to the vacuum chamber to vary the pressure in the selected compartment of said power cylinder to create differential pressures on opposite sides of said power member to effect movement thereof in the selected direction of movement of the steering element for power-activation of the steered elements whereby a reactionary force supplemented by said spring means is induced in said steering and steered elements tending to return said valve elements to neutral position wherein pressures on opposite sides of said power member are balanced when movement of the steering element is halted; a source of vacuum production connected to said vacuum supply conduit; a vacuum accumulator interposed in said supply conduit; a solenoid controlled shut-off valve interposed in said supply conduit between said accumulator and steering control valve means to isolate said accumulator from said steering control valve means thereby disabling power assistance to said steered elements; a speed-sensitive switch operated at speeds proportional to said drive line for controlling said shut-off valve; and an electrical circuit including a source of electrical energy for energizing said solenoid to close said shut-off valve when the speed of the drive line reaches a predetermined factor.

2. A vacuum booster mechanism according to claim 1 in which said vacuum chamber is defined by a longitudinal bore in said outer valve element and a ring-like space between a pair of longitudinally spaced annular lands fixed on said inner valve element in air-tight sealed relation with respect to said bore, said lands cooperating with a pair of longitudinally spaced ports through the outer valve element normally communicating with said air-vacuum chambers to simultaneously vent the two compartments of said power cylinder to atmosphere for power-inactivation of said power cylinder and selectively connectible to said vacuum chamber to produce differential pressures in said compartments for power-activation of said power cylinder.

3. A vacuum booster mechanism according to claim 2 in which said pair of air-vacuum chambers are each defined by said longitudinal bore in said outer valve element and a ring-like space to one side of each of the opposed sides of said annular lands.

4. A vacuum booster mechanism according to claim 1 in which the source of vacuum production comprises; sub-atmospheric pressure conditions produced within the inlet-manifold of the associated engine resulting from the latter's operation to evacuate the air from said accumulator.

5. A vacuum booster mechanism according to claim 1 in which said speed-sensitive switch comprises: a fixed contact, a movable contact, a normally preloaded spring reacting between a fixed portion on the switch and the movable contact to bias the latter into closed contact engagement with said fixed contact, a centrifugally-operated member driven at speeds proportional to said drive line; a reciprocable member actuatable in one direction as a function of the speed of rotation of said centrifugal member to adjust the movable contact out of engagement with said fixed contact in opposition to the reaction from said last-mentioned spring when the speed of the drive line reaches a predetermined factor thereby rendering the steering control valve means ineffective to control energization of said power cylinder.

6. A vacuum booster mechanism according to claim 1 in which said limiting means comprise: a movable sleeve member encircling a portion of the spring of said spring means, with one of its ends normally engaging one of the pairs of abutment-engaging elements, and its other end predeterminately spaced from the other of said pairs of abutment-engaging elements, to limit relative movement of said pairs of abutment-engaging elements toward each other and thereby establish the limits of the two operating positions of said control valve elements from neutral position.

References Cited in the file of this patent
UNITED STATES PATENTS

| | | |
|---|---|---|
| 818,967 | Jenkins | Apr. 24, 1906 |
| 1,875,226 | Dewandre | Aug. 30, 1932 |
| 2,180,430 | Reitz | Nov. 21, 1939 |
| 2,313,704 | Hey | Mar. 9, 1943 |
| 2,341,502 | Ingres | Feb. 8, 1944 |
| 2,356,492 | Smith | Aug. 22, 1944 |
| 2,487,618 | Twyman | Nov. 8, 1949 |
| 2,702,529 | Doerfner | Feb. 22, 1955 |
| 2,719,511 | Presnell | Oct. 4, 1955 |
| 2,748,881 | Holley | June 5, 1956 |
| 2,824,447 | Garrison | Feb. 25, 1958 |

UNITED STATES PATENT OFFICE
CERTIFICATE OF CORRECTION

Patent No. 3,000,457                          September 19, 1961

Glenn T. Randol

It is hereby certified that error appears in the above numbered patent requiring correction and that the said Letters Patent should read as corrected below.

Column 2, line 14, for "aforesaid" read -- associated --; line 53, strike out "lated"; column 6, line 2, for "side" read -- sides --; column 7, line 49, for "top" read -- stop --; column 10, lines 39 and 40, for "induces" read -- induce --; column 11, line 3, for "side" read -- sides --; column 12, line 46, for "Embeded" read -- Embedded --; column 15, line 30, for "enable" read -- enables --; column 16, line 37 and column 19, line 42, for "side", each occurrence, read -- sides --; column 21, line 11, for "bolted" read -- halted --; column 23, line 1, strike out "air", first occurrence.

Signed and sealed this 4th day of May 1965.

(SEAL)
Attest:

ERNEST W. SWIDER                                   EDWARD J. BRENNER
Attesting Officer                                  Commissioner of Patents